United States Patent [19]

Lindner

[11] Patent Number: 4,871,508

[45] Date of Patent: Oct. 3, 1989

[54] METHOD FOR OPERATION OF A LIGHT WATER BOILING REACTOR

[75] Inventor: Johann Lindner, Västerås, Sweden

[73] Assignee: AB ASEA-ATOM, Västerås, Sweden

[21] Appl. No.: 126,504

[22] Filed: Nov. 30, 1987

[30] Foreign Application Priority Data

Dec. 1, 1986 [SE] Sweden .............................. 8605139

[51] Int. Cl.[4] ............................................ G21C 19/00
[52] U.S. Cl. .................................... 376/260; 376/207;
376/236
[58] Field of Search ................ 376/207, 236, 260, 267

[56] References Cited

U.S. PATENT DOCUMENTS

| | | | |
|---|---|---|---|
| 4,169,760 | 10/1979 | Bevilacqua | 376/236 |
| 4,302,289 | 11/1981 | Lindgren | 376/267 |
| 4,326,919 | 4/1982 | Hill | 376/267 |
| 4,642,216 | 2/1987 | Orr | 376/327 |
| 4,717,528 | 1/1988 | Meyer | 376/237 |

Primary Examiner—Donald P. Walsh
Attorney, Agent, or Firm—Watson, Cole, Grindle & Watson

[57] ABSTRACT

A core of a light water boiling reactor comprises a plurality of vertical fuel assemblies (10) and a plurality of control rods, each control rod comprising four vertical blades arranged in a cruciform. The control rods are arranged with each one of their blades between two fuel assemblies located in the same row, such that each control rod together with four fuel assemblies arranged around the blades of the control rod form a unit, the control rod unit (30, 30-o), having an at least substantially square cross-section. The control rod units are arranged in a symmetrical lattice with each control rod unit included in two rows of control rod units perpendicular to each other. After a period of operation of the reactor, when exchanging fuel rods which are present in the reactor at the time of exchange and have been used during the operating period, for new control rods, there are arranged in some control rod units (dark squares) control rods with a reactivity worth which is higher than the original reactivity worth of the control rods which have been used, whereas in other control rod units (light squares) there are used control rods which have been used in the reactor during the operating period (FIG. 2).

7 Claims, 2 Drawing Sheets

METHOD FOR OPERATION OF A LIGHT WATER BOILING REACTOR

BACKGROUND OF THE INVENTION

A core in a boiling reactor normally comprises several hundred fuel assemblies. These are arranged vertically in the core and have an at least substantially square cross-section. Each fuel assembly consists of a bundle of fuel rods which are surrounded by a fuel channel. The core also comprises a large number of control rods, which may each comprise four vertical blades arranged in a cruciform configuration and provided with a neutron absorber material. The fuel assemblies are normally arranged in a symmetrical lattice, with each fuel assembly included in two rows of fuel assemblies, located perpendicular to each other, and the control rods normally being arranged with each one of their absorber blades between two fuel assemblies located in the same row, so that each control rod together with four fuel assemblies, arranged around its blades, forms a unit, in the following called control rod unit, having an at least substantially square cross-section and so that the control rod units are arranged in a symmetrical lattice, with each control rod unit included in two rows of control rod units located perpendicular to each other.

The present invention relates to the operation of a nuclear reactor of the type described above.

When the burnup in a reactor has progressed so far that the smallest acceptable core reactivity margin has been attained, a partial recharging of fuel is carried out. By suitably balancing the amount of fuel to be replaced as well as the fissile enrichment of the replacement fuel, an excess reactivity is effected which permits a certain energy output until the next refuelling occasion. In connection with refuelling, when the reactor is shut down, an exchange of control rods is also carried out, if necessary, in which control rods the reactivity worth (by consumption of neutron absorber) has dropped to a predetermined value, or which control rods exhibit defects. Normally, the exchange of control rods is carried out if the reactivity worth in one-fourth of the length of the control rod has dropped to 90% of the original reactivity worth. By reactivity worth of a control rod is meant that change in reactivity which follows the complete insertion of a fully withdrawn control rod in a critical reactor under given conditions.

When exchanging control rods, control rods existing in the reactor at the time of the exchange are replaced, according to the state of the art, by control rods having the same reactivity worth as that of the existing ones in their original state. In this way, the behaviour of the reactor is maintained unchanged.

The control rods in a boiling reactor bind a certain amount of reactivity in the reactor. Together with burnable neutron absorbers, for example digadolinium trioxide, in the fuel, a smallest permissible shutdown margin is obtained for a given core. If it is desired to achieve longer fuel cycles, i.e., a longer operating time between two refuellings, or a larger energy output in the reactor, the shutdown margin in a core with existing control rods has to be dimensioned using an increased quantity of burnable neutron absorber. Such use of an increased quantity of burnable absorber results in reactivity losses because of increased reactivity penalty of residual burnable absorber at the end of a fuel cycle (such as because of an increased content of isotopes of gadolinium with a low absorption cross-section for neutrons). Thus, an increased use of a burnable absorber enables a greater flexibility regarding the design of the core with reactor fuel but at the same time results in increased losses because of the reactivity penalty of residual neutron absorber.

SUMMARY OF THE INVENTION

The present invention is based on the realization that the increased shutdown margin, which is required for longer fuel cycles or for a greater energy output, can be brought about without the above-described disadvantages—consisting of the increased reactivity penalty caused by the use of an increased amount of neutron absorbers—occurring. According to the invention, this is achieved by the fact that some of the control rods located in the reactor, when exchanging control rods, are replaced by control rods having a higher reactivity worth than the original reactivity worth of the control rods present in the reactor at the time of exchange, whereas other control rods used during the earlier operation of the reactor are maintained in the reactor. The invention makes it possible, with a limited number of control rods with a higher reactivity worth, to achieve the same operational advantages as if all the existing control rods were to be exchanged for others with a higher reactivity worth. The advantages thus gained are very considerable.

The present invention relates more particularly to a method for the operation of a light water boiling reactor with a core comprising a plurality of vertical fuel assemblies having an at least substantially square cross-section, each fuel assembly consisting of a bundle of fuel rods surrounded by a fuel channel, and a plurality of control rods, each control rod comprising four vertical blades arranged in a cruciform and provided with a neutron absorber material, the fuel assemblies being arranged in a symmetrical lattice with each fuel assembly included in two rows of fuel assemblies which are perpendicular to each other and the control rods being arranged with each one of their blades between two fuel assemblies located in the same row, so that each control rod together with four fuel assemblies, arranged around the blades of the control rod, forms one unit, a control rod unit, having an at least substantially square cross-section, the control rod units being arranged in a symmetrical lattice with each control rod unit included in two rows of control rod units perpendicular to each other, characterized in that, after a period of operation of the reactor, when exchanging control rods, which are present in the reactor at the time of exchange and which have been used during the operating period, for new control rods, there are arranged in some control rod units control rods having a reactivity worth which is higher than the original reactivity worth of the control rods which are present in the reactor at the time of exchange and have been used during the operating period, whereas in other control rod units there are used control rods which have been used in the reactor during the operating period.

The reactivity worth, in a cold shutdown reactor, of the newly inserted control rods with the higher reactivity worth is at least 6% higher, preferably 10-20% higher, than the original reactivity worth of the control rods present in the reactor at the time of the exchange. By original reactivity worth of a control rod is meant in this patent application the reactivity worth of a control rod in a non-used state.

To utilize the invention in full, the exchange of existing control rods for new control rods with a higher reactivity worth only takes place in control rod units located in a central zone of the reactor core, which is located inside an edge zone extending around the reactor core and comprising those control rod units which are located furthest out in the reactor core in each row of control rod units.

According to one embodiment of the invention, control rods which have been used during a preceding operating period are maintained in a number of control rod units distributed over the central zone of the reactor core, whereas at least the control rods in those control rod units which are located adjacent to each such control rod unit with maintained control rod and in the same rows perpendicular to each other as this control rod unit with maintained control rod are replaced by new control rods with a higher reactivity worth. Control rods used during the earlier operating period in regions within the central part of the reactor core, comprising 3×3 control rod units, can then be exchanged for new control rods with a higher reactivity worth in that control rod unit which is located in the centre of the region and in those four control rod units which are located in the same rows, perpendicular to each other, as the control rod unit located in the centre, whereas control rods used during the earlier operating period are maintained in the remaining four control rod units. The exchange of fuel rods is preferably performed such that new control rods with a higher reactivity worth are arranged in three control rod units at most, located adjacent to each other, in the same row of control rod units.

The number of control rods used during the earlier operating period, which are replaced by new control rods, preferably amounts to 40-60% of the number of control rods in the entire reactor core and to 50-80% of the number of control rods in the central zone of the reactor core.

The invention will be explained in greater detail, by way of example, with reference to the accompanying drawings.

DETAILED DESCRIPTION

Figure 1:
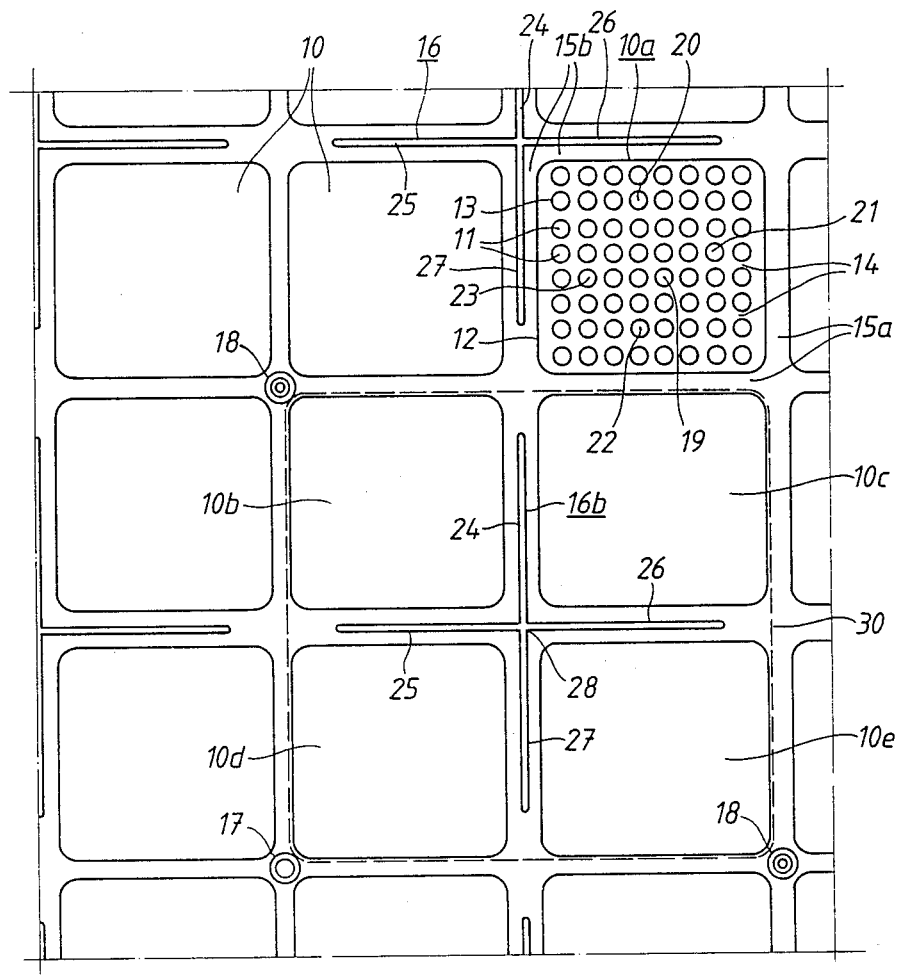
FIG. 1 shows a horizontal section of part of a reactor core for a light water boiling reactor.

FIG. 1 shows a small part of a horizontal section of a reactor core for a boiling reactor with vertical fuel assemblies. The section comprises nine full fuel assemblies 10. The total number of fuel assemblies in a complete cross-section amounts to several hundred. Each fuel assembly, for example 10a, is built up of a bundle of 64 fuel rods 11 in a square lattice and of a fuel channel 12 of zircaloy-4 of square cross-section surrounding the fuel rod bundle. The rods are held in their positions by so-called spacers (not shown) which are evenly distributed between the top tie plate and the bottom tie plate (also not shown) on the fuel assembly. Each fuel rod consists of a number of circular-cylindrical pellets of uranium dioxide as fuel, which are stacked on top of each other and canned in a cladding tube 13 of zircaloy-2. The spaces 14 between the fuel rods within the fuel channel are traversed by a coolant, in the exemplified case light water. The gaps 15a and 15b between the fuel assemblies are also traversed by a coolant of the same kind. The gaps 15b into which control rods 16 can be inserted are, in the illustrated case, wider than the gaps 15a in which there are no control rods. The cross-section also comprises neutron sources 17 as well as neutron detectors 18. One or more of the fuel rods may be exchanged for a non-energy producing rod. Thus, for example, rod 19 could be exchanged for a solid or water-filled rod of zircaloy-2. The fuel rods 20, 21, 22 and 23 are tie rods and are anchored to top tie plate and bottom tie plate in the fuel assembly. The control rods 16 have absorber blades 24, 25, 26 and 27 arranged in a cruciform. The centre of the control rod cross is designated 28. As will be clear from Figure 1, the fuel assemblies 10 are arranged in a symmetrical lattice with each fuel assembly included in two rows of fuel assemblies which are perpendicular to each other. The control rods 16 are arranged with each one of their blades between two fuel assemblies located in the same row. In this way, each control rod, for example 16b, together with four fuel assemblies 10b, 10c, 10d, 10e, arranged around its blades can be said to form a unit 30, previously called control rod unit, which in FIG. 1 is surrounded by a dashed line. A control rod unit has an at least substantially square cross-section, and, as will also be clear from FIG. 1, the control rod units are arranged in a symmetrical lattice with each control rod unit included in two rows of control rod units which are perpendicular to each other.

Figure 2:
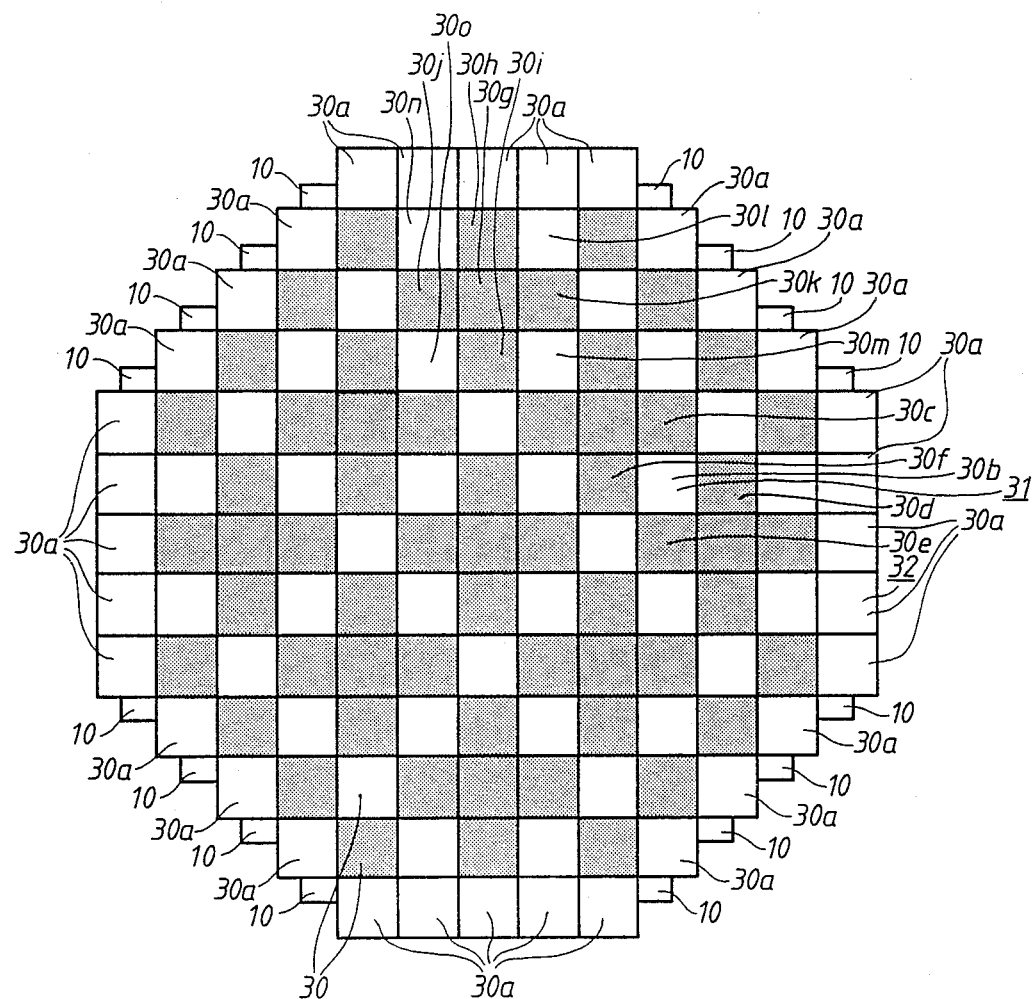
FIG. 2 shows, schematically on a reduced scale, a horizontal section of a complete reactor core.

FIG. 2 shows the control rod units in the reactor core and a number of separate fuel assemblies 10 arranged in outer regions of the core. The control rod units 30 are illustrated as light squares in those positions where, at the time of the fuel rod exchange, control rods used during the earlier operating period are arranged, and as dark squares where control rods used during the earlier operating period are replaced by new control rods with a higher reactivity worth, in the exemplified case with a 15% higher reactivity worth in a cold shutdown reactor, than the original reactivity worth of the control rods used during the earlier operating period.

In the exemplified case, the exchange of control rods for new control rods has only been carried out in control rod units in a central zone 31 in the reactor core, which is located inside an edge zone 32 extending around the reactor core and comprising those control rod units 30a which are located furthest out in the reactor core in each row of control rod units.

As will be clear from FIG. 2, after the control rod exchange a number of control rod units (light squares), which have been used during the earlier operating period, are distributed over the central zone. It is also clear that the control rods in those control rod units, for example 30c, 30d, 30e and 30f, which are located adjacent to each such control rod unit, for example in unit 30b, and which are located in the same rows perpendicular to each other as this control rod unit, consist of control rod units having a higher reactivity worth.

From the case exemplified in FIG. 2 it is also clear that the reactor core comprises regions within the central zone comprising 3×3 control rod units, for example units 30g, 30h, 30i, 30j, 30k, 30l, 30m, 30n and 30o, where control rods used during the earlier operating period are exchanged for new control rods having a higher reactivity worth in that control rod unit which is located in the centre, i.e. in unit 30g, and in those four control rod units, i.e. in units 30h, 30i, 30j and 30k, which are located in the same rows perpendicular to each other as the control rod unit located in the centre, whereas control rods used during the earlier operating period are used in the remaining four control rod units, i.e. in units 30*l*, 30*m*, 30*n* and 30*o*.

New control rods having a higher reactivity worth are arranged in three control rod units at the most, located adjacent to each other, for example in units 30*g*, 30*h* and 30*i*, in the same row of control rod units in the central zone 31.

In the case illustrated in FIG. 2, 47% of the total number of control rods included in the reactor core and 63% of the total number of the control rods included in the central zone of the reactor are replaced by new control rods having a higher reactivity worth.

I claim:

1. A method for the operation of a light water boiling reactor with a core comprising a plurality of vertical fuel assemblies having an at least substantially square cross-section, each fuel assembly consisting of a bundle of fuel rods surrounded by a fuel channel, and a plurality of control rods, each control rod comprising four vertical blades arranged in a cruciform and provided with a neutron absorber material, the fuel assemblies being arranged in a symmetrical lattice with each fuel assembly included in two rows of fuel assemblies which are perpendicular to each other and the control rods being arranged with each one of their blades between two fuel assemblies located in the same row, so that each control rod together with four fuel assemblies arranged around the blades of the control rod form one unit, a control rod unit having an at least substantially square cross-section, the control rod units being arranged in a symmetrical lattice, with each control rod unit included in two rows of control rod units perpendicular to each other, said method comprising the steps of (a) operating said light water boiling reactor for an operating period until refuelling is needed, and then (b) exchanging in some control rod units control rods used during the operating period for new control rods having a reactivity worth which in a cold shut-down reactor is at least 6% higher than the original reactivity worth of the exchanged control rods, while maintaining in other control rod units control rods used during the operating period, the number of control rods with a higher reactivity worth after the exchange amounting to 40–60% of the total number of control rods of the reactor core.

2. Method according to claim 1, wherein in a cold shutdown reactor the reactivity worth of the new control rods with the higher reactivity worth is 10–20% higher than the original reactivity worth of the control rods which are present in the reactor at the time of exchange and have been used during the operating period.

3. Method according to claim 1, wherein the exchange of control rods for new control rods with a higher reactivity worth takes place in control rod units in a central zone of the reactor core, which is located inside an edge zone extending around the reactor core and comprising those control rod units which are located furthest out in the reactor core in each row of control rod units.

4. Method according to claim 3, in a number of control rod units distributed over the central zone of the reactor core there are used control rods which have been used in the reactor during the operating period and that at least the control rods in those control rods units which are located adjacent to each such control rod unit with a used control rod and in the same rows, perpendicular to each other, as said control rod unit with a used control rod, are exchanged for new control rods having a higher reactivity worth.

5. Method according to claim 3 or 4, wherein in regions within the central zone of the reactor core comprising 3×3 control rod units, control rods used during the operating period are exchanged for new control rods with a higher reactivity worth in that control rod unit which is located in the centre and in those four control rod units which are located in the same rows, perpendicular to each other, as said control rod unit located in the centre, whereas control rod which have been used during the operating period are used in the remaining four control rod units 6. Method according to claim 3 or 4, wherein when exchanging control rods new control rods with a higher reactivity worth are arranged in three control rod units at most, positioned adjacent to each other, in the same row of control rod units.

7. Method according to claim 3 or 4, wherein of the control rods used during the operating period, 50–50% of the total number of control rods in the central part of the reactor core are exchanged for new control rods with a higher reactivity worth.

* * * * *